United States Patent [19]

Gano

[11] 4,166,475
[45] Sep. 4, 1979

[54] SAFETY COUPLING

[75] Inventor: John C. Gano, Carrollton, Tex.

[73] Assignee: Otis Engineering Corporation, Dallas, Tex.

[21] Appl. No.: 911,098

[22] Filed: May 31, 1978

Related U.S. Application Data

[63] Continuation of Ser. No. 778,046, Mar. 16, 1977, abandoned, which is a continuation of Ser. No. 612,901, Sep. 12, 1975, abandoned.

[51] Int. Cl.² ............................................. F16L 29/00
[52] U.S. Cl. .............................. 137/68 R; 137/614.03
[58] Field of Search ........... 137/68 R, 614.03, 614.04, 137/614.06

[56] References Cited

U.S. PATENT DOCUMENTS

| 222,326 | 12/1879 | Stevens | 137/614.06 |
| 223,183 | 12/1879 | Stevens | 137/614.06 |
| 3,435,848 | 4/1969 | Johnston | 137/614.04 |
| 3,572,032 | 3/1971 | Terry | 60/478 X |
| 3,719,194 | 3/1973 | Anderson et al. | 137/68 R |

FOREIGN PATENT DOCUMENTS 982261  6/1951  France ............................... 137/614.04

Primary Examiner—Gerald A. Michalsky
Attorney, Agent, or Firm—Vinson & Elkins

[57] ABSTRACT

A safety coupling for a conduit such as an underwater pipeline which is disconnectable when said pipeline is subjected to a predetermined longitudinal force to prevent damage to the pipeline and which includes valve means operable as disconnection of the coupling occurs to prevent loss of pipeline fluids.

13 Claims, 11 Drawing Figures

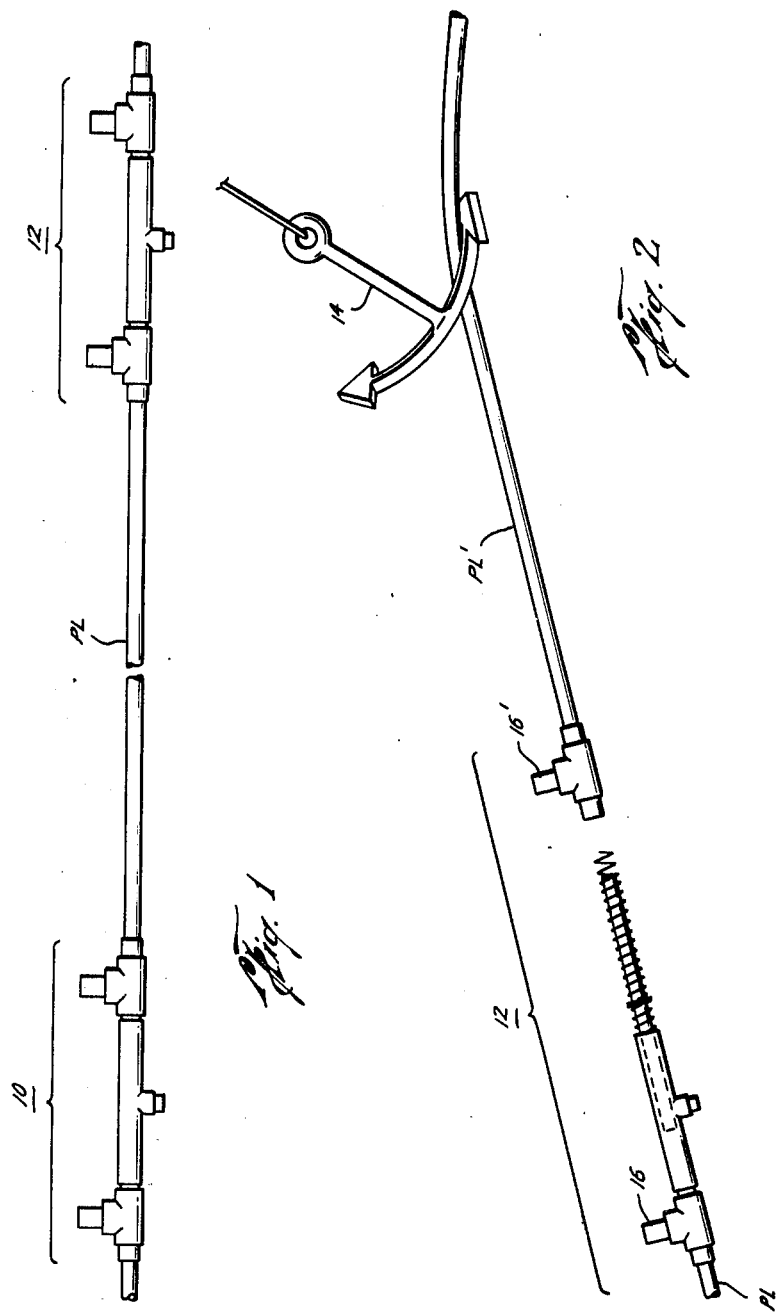

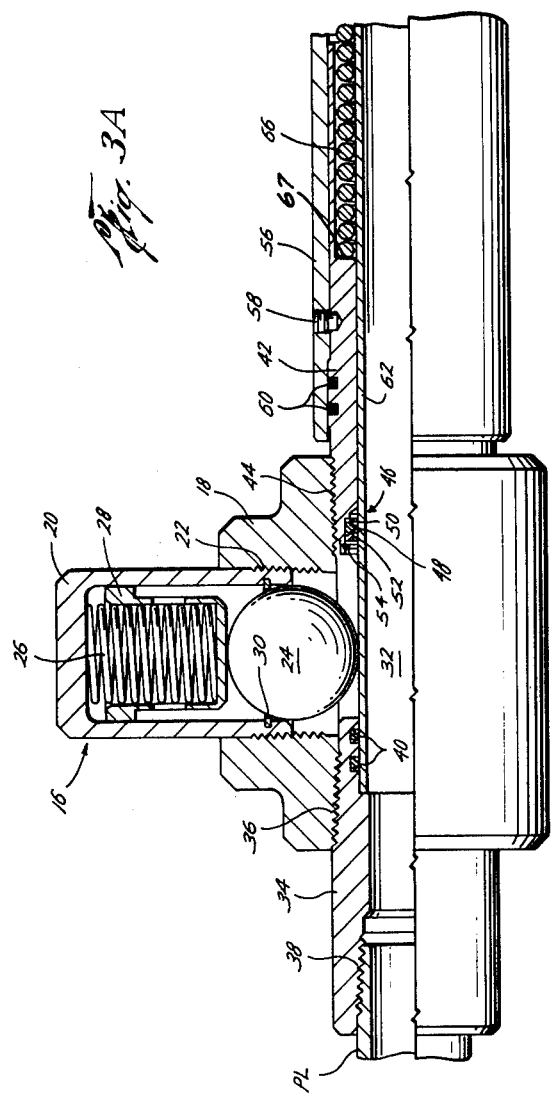

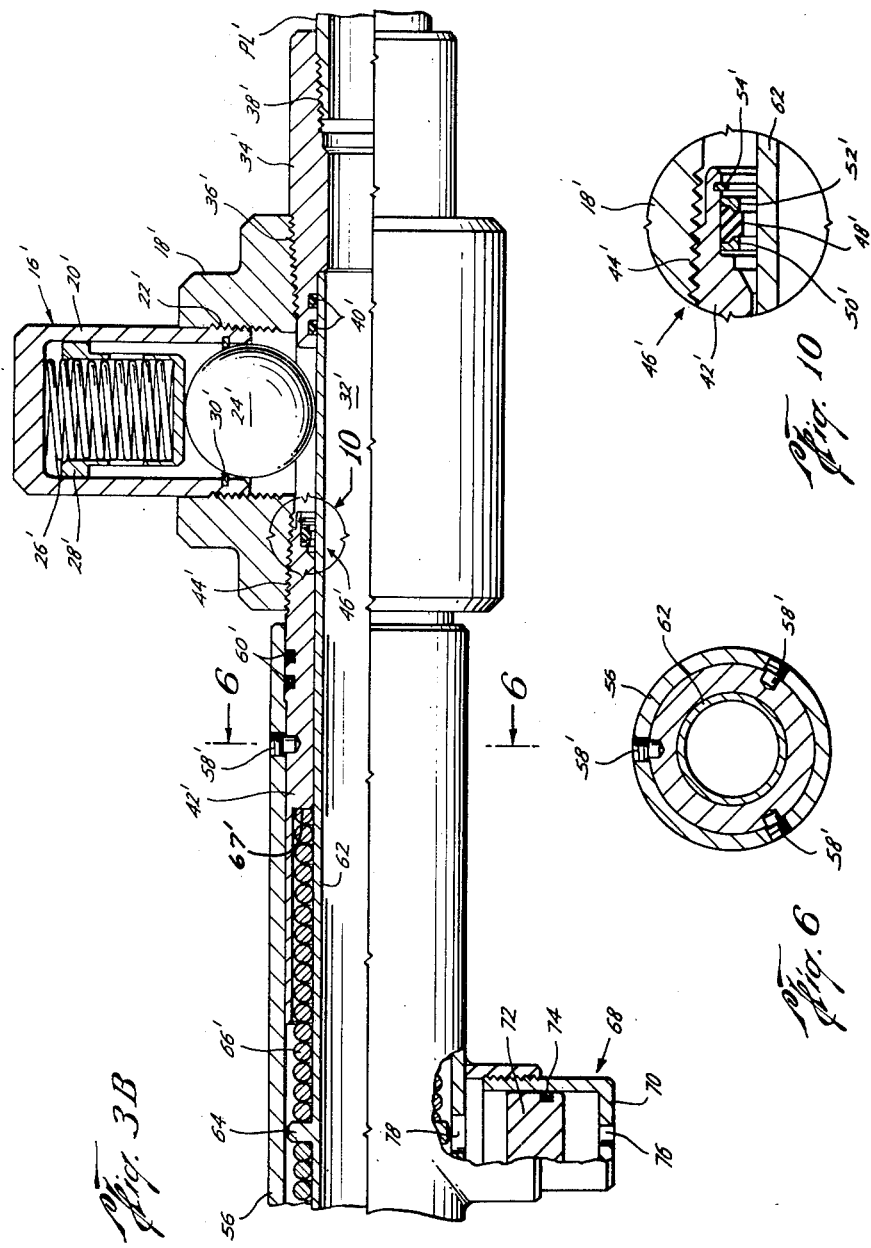

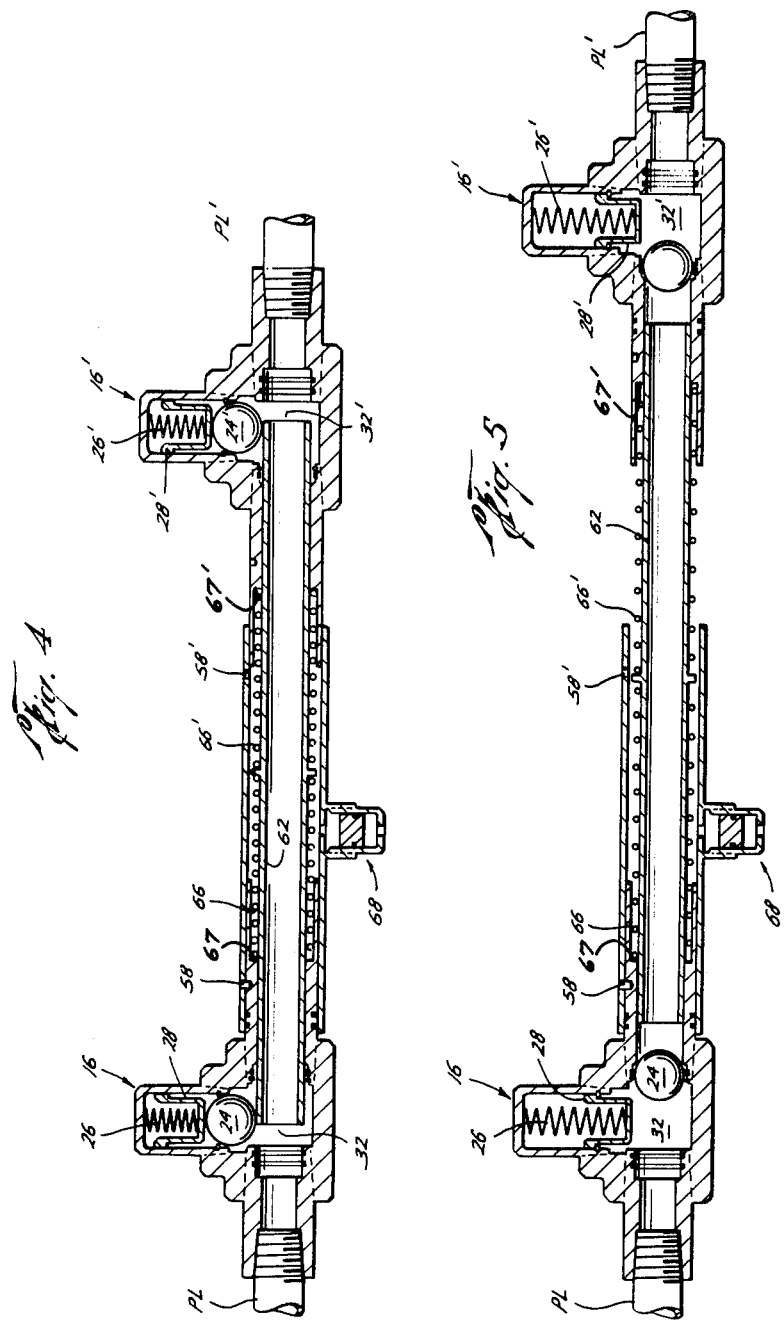

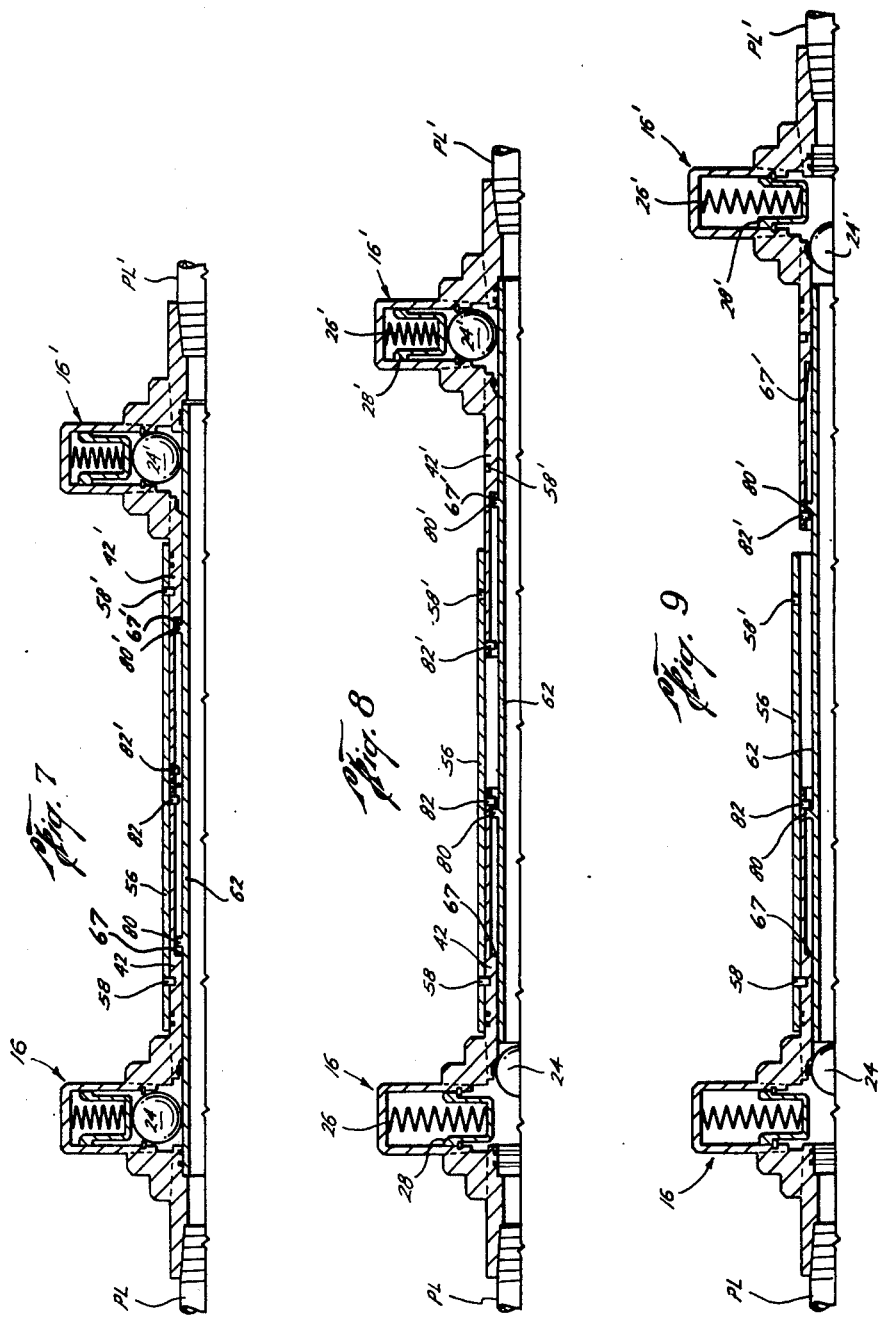

SAFETY COUPLING

RELATED APPLICATIONS

This is a continuation application of my copending U.S. application Ser. No. 778,046, filed Mar. 16, 1977, now abandoned, which is a continuation application of my abandoned application Ser. No. 612,901, filed Sept. 12, 1975, for "Safety Coupling."

BACKGROUND OF THE INVENTION

This invention relates to safety apparatus for conduits, and more particularly, to a safety coupling for conduits such as underwater pipelines for preventing breakage or damage to underwater pipelines and for preventing loss of pipeline fluids therefrom, which apparatus is actuated when the pipeline is subjected to a predetermined longitudinal force.

Underwater pipelines are used for transporting petroleum and other fluid products. Damage to and breakage or rupturing of said pipelines is often caused by engagement by ship anchors or other structures. Such damage and breakage to pipelines usually results in the escape of valuable pipeline fluids from the pipeline into the surrounding water. In addition to the loss of such fluids, such fluids may destroy aquatic life and cause property damage. Applicant does not believe that an apparatus is known which successfully and efficiently prevents the loss of pipeline products from a damaged or broken underwater pipeline.

Another problem which exists with underwater pipelines which are subjected to extreme longitudinal forces due to snagging by ship anchors or other structures is the prevention of severe damage to the pipeline and to wellhead equipment associated with said pipeline. Applicant is unaware of any apparatus which successfully and efficiently prevents severe damage to a pipeline and to wellhead equipment associated with said pipeline when the pipeline is subjected to such longitudinal forces.

Applicant solves the problems of preventing severe damage to conduits such as underwater pipelines and of preventing substantial loss of pipeline products from an underwater pipeline to which a predetermined longitudinal force is applied by including one or more safety couplings in said pipeline.

It is therefore an object of this invention to provide a safety coupling for a conduit such as an underwater pipeline including valve means operable by predetermined longitudinal forces applied to said line to effect disconnection of the coupling to thereby protect the line against damage or breakage with the valve means closing the ends of the line to prevent escape of fluids.

It is a further object of this invention to provide a safety coupling having a pair of valves, one at each end thereof located out of the line of flow and movable into a position closing the ends of the conduit bore which ends are separated when the coupling is disconnected.

It is another object of this invention to provide a safety coupling wherein the valves of said coupling are connected to a conduit and remain a part of said conduit after the coupling is disconnected.

It is still a further object of this invention to provide a safety coupling whereby upon the application of a sufficient predetermined longitudinal force, the valves of said coupling first close preventing the flow of conduit fluids therefrom, and then the coupling disconnects at an intermediate point.

Other objects features and advantages of this invention will be apparent from the drawings, the specification and the claims.

BRIEF DESCRIPTION OF THE DRAWINGS

In the drawings wherein like reference numerals indicate like parts and wherein the illustrative embodiments of this invention are shown:

FIG. 1 is a schematic drawing of a pipeline having two safety couplings.

FIG. 2 is a schematic illustration of a safety coupling being activated by a ship anchor.

FIGS. 3A and 3B are views partly in section and partly in elevation of the safety coupling installed in a pipeline.

FIG. 4 is a view partly in section and partly in elevation of the safety coupling after the shear pin on the right side thereof has been sheared.

FIG. 5 shows the safety coupling after both safety valves have been seated.

FIG. 6 is a cross-sectional view of the safety coupling taken along line 6—6 of FIG. 3B.

FIG. 7 is a view partly in section and partly in elevation of an alternative embodiment of the invention.

FIG. 8 shows the alternative embodiment after the shear pin on the right hand side of the safety coupling has been sheared.

FIG. 9 shows the alternative embodiment of the invention after both valves of the safety coupling have been seated.

FIG. 10 shows an enlarged view of the valve seating means of FIGS. 3A and 3B.

DESCRIPTION OF THE PREFERRED EMBODIMENTS

Applicant's invention is illustrated herein as applied to pipelines; however, application to other forms of conduits is contemplated by applicant.

In accordance with the invention, FIG. 1 illustrates an underwater pipeline PL having two identical safety couplings 10 and 12 included therein. These couplings may be spaced along the line at selected distances and particularly adjacent shipping or fishing lanes to protect the line. The general operation of each safety coupling is illustrated in FIG. 2 which shows the pipeline PL snagged by a ship anchor 14. As the anchor 14 exerts a pull on the pipeline PL, it applies a longitudinal force to the pipeline and to the coupling 12 causing the coupling 12 to disconnect and separate and at the same time allows valve assemblies 16 and 16' in coupling 12 to move from open to closed position. Closed valve assemblies 16 and 16' prevent substantial escape of pipeline products from the pipeline into the water surrounding the pipeline. Since the pipeline is allowed to separate on application of a predetermined longitudinal force, well and wellhead equipment such as christmas trees connected to said pipeline are not subjected to potentially damaging longitudinal forces.

The safety coupling connected to a first pipeline section PL (FIG. 3A) and a second pipeline section PL' (FIG. 3B) is illustrated in detail in FIGS. 3A and 3B. Referring to FIG. 3A, a first valve means or assembly 16 is provided for preventing the flow of pipeline fluids through pipeline PL after a predetermined longitudinal force is applied thereto.

Valve assembly 16 includes an annular housing tee 18 into which a valve retainer cap 20 is secured by suitably matching threads 22. Within cap 20 is housed a ball closure means 24 of the usual type which is continually urged to the downward position by a spring 26 confined between the top of the retainer cap and cup-like spring retainer means 28. A snap ring 30 is located in the retainer cap for limiting the axial displacement of retainer means 28 so that retainer means 28 in the extreme downward position does not extend into the pipeline fluid channel 32 in valve means 16 and interfere with the operation of the ball valve 24.

The valve assembly 16 is secured to connecting nipple 34 by suitably matching threads 36 and connecting nipple 34 is secured to pipeline PL by suitably matching threads 38. Connecting nipple 34 contains sealing rings 40 for a purpose described more fully hereinafter.

Valve assembly 16 is also connected to a second connecting nipple 42 by suitably matching threads 44. Said second connecting nipple 42 contains valve seating means 46 for seating the ball 24 which operation is described more fully hereinafter. Valve seat means 46 contains an annular sealing element 48 which is confined on either side by annular rings 50 and 52. Sealing element 48 and annular rings 50 and 52 are held in position by an annular locking ring 54.

Nipple 42 extends in telescoping fashion within annular body or housing 56. In order to provide a means for releasably securing said annular body 56 to said connecting nipple 42, shear pins 58 are provided which extend through both members. Annular body 56 and connecting nipple 42 in normal position are held in sealing engagement by a pair of O-rings 60.

A second valve means 16' is mounted in the second section of pipeline and movable from an open to a closed position to close the second section of pipeline. Second valve means 16' is illustrated in FIG. 3B which shows the right-hand side of the safety coupling whose left-hand side is shown in FIG. 3A. Since the safety coupling shown in FIGS. 3A and 3B is symmetrical about its center, the component parts shown in FIG. 3B denoted by primed numerals operate in the same manner and have the same function as their unprimed counterparts in FIG. 3A.

It will be appreciated that body 56 and pins 58 and 58' releasably connect first valve means 16 to second valve means 16' so that said first and second valve means may separate on application of a predetermined longitudinal force on said pipeline.

As shown in FIG. 3A and 3B, in order to provide a means for releasably locking ball valve 24 and ball valve 24' in the open position while said coupling is in normal position so that pipeline fluids may flow freely from pipeline section PL to pipeline section PL' through a fluid channel in the safety coupling without obstruction, an elongate retainer sleeve 62 is provided which extends generally through the length of the pipeline coupling and sealingly engages valve assemblies 16 and 16' by O-rings 40 and 40' respectively. The retainer sleeve provides a means for releasably locking said first and second valve assemblies in the open position while said first and second valve assemblies are connected. Also, while the first and second valve assemblies are connected as shown in FIGS. 3A and 3B, sleeve 62 provides a fluid conduit for flow of pipeline fluids between pipeline sections PL and PL'.

A means for closing said first and second valve means responsive to a predetermined longitudinal force on the pipeline is provided.

Retainer sleeve 62 is provided with an annular shoulder 64. Springs 66 and 66' are confined between annular shoulder 64 and shoulders 67 and 67' on connecting nipple 42 and 42', respectively, for continually urging retainer sleeve 62 to a position intermediate valve assemblies 16 and 16'. Springs 66 and 66' acting on shoulder 64 of sleeve 62 thus comprise a means for positively moving the sleeve 62 to a position actuating both said first and second valve means to permit said first and second valve means to move to closed position upon movement of said first and second valve means apart a selected distance. Also, retainer sleeve 62 in combination with springs 66 which urge sleeve 62 away from valve assemblies 16 and 16', together with springs 26 and 26' which urge ball closure means 24 and 24' into downward position comprise a means for closing said first and second valve means responsive to a predetermined longitudinal force on the pipeline.

In substantially the center of the safety coupling, as shown in FIG. 3B, is a pressure balancing means 68 for balancing the pressure of fluids in the pipeline coupling with the water pressure outside the coupling. Said pressure balancing means 68 comprises cup-like housing 70 which contains a piston 72 which sealably engages the inner surface of said housing 70 by O-rings 74 or other suitable sealing means. Housing 70 is secured to annular body 56 of the safety coupling by welding or other suitable means. Pressure balancing means 68 includes a port 76 which allows water to flow freely into balancing means 68 below piston 72 and includes port 78 which allows fluids within the annulus provided by sleeve 62 and annular body 56 to flow freely into balancing means 68 above piston 72. Thus, piston 72 is able to move longitudinally within its chamber responsive to fluid pressure inside, such annulus between body 56 and sleeve 62, and outside the pipeline, and thus, prevents significant pressure differentials between the fluids in the annulus and water which could be caused by changes in temperature, changes in ambient pressure, changes in water depth and the like. During or after the coupling is assembled, this annulus may be filled with a suitable fluid such as oil or grease to prevent corrosion of the materials defining such annulus and of the corrosive materials within such annulus. Alternatively, housing 56, sleeve 62, springs 66 and 66', and nipples 42 and 42' could be built of non-corrosive material and ports could be made in housing 56 to allow seawater into this annulus.

The operation of the pipeline coupling is illustrated with reference to FIGS. 3A, 3B, 4 and 5.

FIGS. 3A and 3B show the pipe coupling in its normal position with valve assemblies 16 and 16' in open position so that pipeline fluids flow freely through the coupling. When a sufficient longitudinal force is applied on the pipeline, either pins 58 or 58' will shear.

FIG. 4 illustrates the operation of the coupling when pins 58' shear and the line is pulled apart as by an anchor dragging across the line. Since springs 66 and 66' bias retainer sleeve 62 to a longitudinal position substantially equidistant valve assembly 16 and 16', retainer sleeve 62, as shown in FIG. 4, moves to the right with respect to valve assembly 16 and to the left with respect to valve assembly 16'. As shown in FIG. 4, retainer sleeve 62 has moved out of sealing engagement with connecting nipples 34 and 34'.

As the pipeline sections PL and PL' continue to move apart, retainer sleeve 62, as shown in FIG. 5, is urged to a position intermediate valve assembly 16 and 16' so that sleeve 62 no longer maintains ball closure means 24 and 24' out of the pipeline fluid channels 32 and 32' in valve assemblies 16 and 16', respectively. After retainer sleeve 62 is moved out of engagement with and releases balls 24 and 24', springs 26 and 26' which bias spring retainer means 28 and 28' into a downward position move ball closure means 24 and 24' into the fluid channels 32 and 32' of the pipeline coupling. Pipeline fluids which move toward the pipeline coupling urge balls 24 and 24' into seating engagement with valve seating means 46 and 46', respectively.

Upon the continued application of forces tending to separate valve assemblies 16 and 16' by external forces such as the ship anchor shown in FIG. 2, valve assemblies 16 and 16' may separate completely with valves 16 and 16' closed, thus preventing severe damage to the pipeline and loss of pipeline fluids. Where couplings are positioned on either side of a shipping lane both couplings may be separated.

An alternative embodiment for activating valve assemblies 16 and 16' of the invention is illustrated in FIGS. 7, 8 and 9.

As shown in FIG. 7, the means for causing retaining sleeve 62 to release balls 24 and 24' so that valves 16 and 16' close the pipeline bore to the flow of pipeline products comprises stops 80 and 80' on retainer sleeve 62 and limit pins 82 and 82' on connecting nipples 42 and 42' respectively. When a sufficient longitudinal force is applied to the pipeline and to the pipe coupling, one of the sets of pins 58 or 58' will shear before the pipeline is ruptured. FIGS. 8 and 9 illustrate the operation of the alternative embodiment coupling when pins 58' are sheared.

After pins 58' are sheared, the longitudinal force on the pipeline causes the coupling to elongate with one of the valves such as valve assembly 16' and connecting nipple 42' moving axially away from annular body 56. Although retainer sleeve 62 is free to move axially in either direction, for purposes of illustration of the operation of the alternative embodiment, this example assumes that the retainer sleeve moves axially away from annular body 56 with valve assembly 16'. As the coupling elongates so that limit pin 82 is close to stop 80, retainer sleeve 62 releases ball 24. Ball 24 is urged from the upward and open position by spring retainer means 28 and spring 26 which operate in the same manner as in the preferred embodiment, causing ball 24 to move into the seated position as shown in FIG. 8.

As the coupling continues to telescope outwardly upon application of continued longitudinal force, limit pin 82 engages stop 80 on retainer sleeve 62, arresting movement of retainer sleeve 62 while the valve assemblies 16 and 16' continue to move apart. When the coupling has become sufficiently elongated such that stop 80' has engaged limit pin 82', retainer sleeve 62 releases ball 24' which is urged into the pipeline fluid channel by spring 26' acting on spring retainer means 28'. The ball 24' may then be forced into seated position as shown in FIG. 9 by the pressure of pipeline fluids flowing toward the coupling from pipeline PL'.

Upon the application of continued longitudinal force, one of the limit pins 82 or 82' may shear, thus allowing pipeline sections PL and PL' to separate as in the preferred embodiment with the valves 16 and 16' attached thereto and in the closed position.

Thus, a pipeline coupling for preventing severe damage to and for preventing the escape of pipeline fluids from an underwater pipeline which is exposed to a potentially damaging longitudinal force has been described in accordance with the preferred and alternative embodiments.

The foregoing disclosure and description of the invention are illustrative and explanatory thereof and various changes in size, shape, and materials, as well as in the details of the illustrated constructions may be made within the scope of the appended claims without departing from the spirit of the invention.

What is claimed is:

1. A safety coupling for a conduit adapted to connect a first and second section of said conduit comprising:
   a first valve means adapted for connection to said first section of said conduit, said first valve means having a fluid channel, said valve means being movable from open to closed position thereby closing flow through said first section of said conduit;
   second valve means adapted for connection to said second section of said conduit, said second valve means having a fluid channel, said second valve means being movable from open to closed positions thereby closing flow through said second section of said conduit;
   means for releasably connecting said first valve means to said second valve means so that said first and second valve means may separate on application of a predetermined longitudinal force on said conduit, said connecting means including a tubular housing extending between said first and second valve means and means for releasably securing said first and second valve means to said housing, said securing means being releasable upon application of a predetermined longitudinal force on said conduit so that at least one of said valve means may separate from said housing;
   an elongate retaining sleeve associated and coacting with the connecting means extending from said first valve means through said housing to said second valve means for releasably retaining said first and second valve means in the open position while said first and second valve means are connected;
   said first and second valve means each comprises a ball closure means and a valve seating means, said ball closure means being normally locked in the open position by said retaining sleeve, said closure means being retained laterally from said fluid channel;
   means for positively moving the retaining sleeve to a position actuating both said first and second valve means to permit said first and second valve means to move to closed position upon movement of the first and second valve means apart a selected distance.

2. The apparatus of claim 1 including means for biasing said ball closure means into the fluid channel of said valve means so that the fluids flowing through the conduit may urge the closure means into sealing engagement with said valve seating means.

3. The apparatus of claim 2 wherein said means for biasing said ball closure means comprises:
   spring retainer means slidable within said valve means; and
   spring means confined between said spring retainer means and the housing of said valve means for urging said spring retainer means into engagement with said ball closure means to bias said ball closure means to the closed position.

4. The apparatus of claim 3 wherein said means for releasably securing said first and second valve means to said housing comprises shear pins.

5. The apparatus of claim 2 wherein said retaining sleeve moving means comprises:
a first spring confined between said first valve means and an annular shoulder located between said first and second valves on said retainer sleeve; and
a second spring confined between said second valve means and said annular shoulder on said retainer sleeve;
said retainer sleeve being continually urged by said first and second springs to a position between said first and second valve means so that when said means connecting said first valve means and second valve is released, said retaining sleeve is moved to a position which unlocks the closure means of said first and second valve means.

6. The apparatus of claim 5 wherein an annular region is formed between said housing and said sleeve and including a means for balancing fluid pressure within said annular region and outside said coupling.

7. The apparatus of claim 6 including a corrosive resistant fluid in said annular region to prevent corrosion of said housing and said sleeve.

8. The apparatus of claim 1 wherein an annular region is formed between said housing and said sleeve and including a means for balancing the pressure of fluids within said annular region with the fluid pressure outside said coupling while preventing the entry of external fluids into the fluid channel.

9. The apparatus of claim 8 including a corrosive resistant fluid in said annular region to prevent corrosion of said housing and said sleeve.

10. A safety coupling for a conduit adapted to connect a first and second section of said conduit comprising:
a first valve means adapted for connection to said first section of said conduit, said first valve means having a fluid channel, said valve means being movable from open to closed position thereby closing flow through said first section of said conduit;
second valve means adapted for connection to said second section of said conduit, said second valve means having a fluid channel, said second valve means being movable from open to closed positions thereby closing flow through said second section of said conduit;
means for releasably connecting said first valve means to said second valve means so that said first and second valve means may separate on application of a predetermined longitudinal force on said conduit, said connecting means including a tubular housing extending between said first and second valve means and means for releasably securing said first and second valve means to said housing, said securing means being releasable upon application of a predetermined longitudinal force on said conduit so that at least one of said valve means may separate from said housing;
elongate retaining sleeve means associated and coacting with the connecting means extending from said first valve means through said housing to said second valve means for releasably retaining said first and second valve means in the open position while said first and second valve means are connected and providing a fluid passageway interconnecting said first and second valve means; and
means for positively moving the retaining sleeve means to a position actuating both said first and second valve means to permit said first and second valve means to move to closed position upon movement of the first and second valve means apart a selected distance;
said first and second valve means each comprising a ball closure means and a valve seating means, said ball closure means being normally locked in the open position by said retaining sleeve and including means for biasing said ball closure means into the fluid channel of said valve means so that the fluids flowing through the conduit may urge the closure means into sealing engagement with said valve seating means;
said retaining sleeve moving means comprising a first spring confined between said first valve means and an annular shoulder located between said first and second valves on said retainer sleeve; and a second spring confined between said second valve means and said annular shoulder on said retainer sleeve;
said retainer means being continually urged by said first and second springs to a position between said first and second valve means so that when said means connecting said first valve means and second valve is released, said retaining sleeve is moved to a position which unlocks the closure means of said first and second valve means.

11. A safety coupling for a conduit adapted to connect a first and second section of said conduit comprising:
a first valve means adapted for connection to said first section of said conduit, said first valve means having a fluid channel, said valve means being movable from open to closed position thereby closing flow through said first section of said conduit;
second valve means adapted for connection to said second section of said conduit, said second valve means having a fluid channel, said second valve means being movable from open to closed positions thereby closing flow through said second section of said conduit;
means for releasably connecting said first valve means to said second valve means so that said first and second valve means may separate on application of a predetermined longitudinal force on said conduit, said connecting means including a tubular housing extending between said first and second valve means and means for releasably securing said first and second valve means to said housing, said securing means being releasable upon application of a predetermined longitudinal force on said conduit so that at least one of said valve means may separate from said housing;
elongate retaining sleeve means associated and coacting with the connecting means extending from said first valve means through said housing to said second valve means for releasably retaining said first and second valve means in the open position while said first and second valve means are connected and providing an unobstructed fluid passageway interconnecting said first and second valve means; and
means for positively moving the retaining sleeve means to a position actuating both said first and second valve means to permit said first and second valve means to move to closed position upon movement of the first and second valve means apart a selected distance;

said first and second valve means each comprises a ball closure means and a valve seating means, said ball closure means being normally locked in the open position by said retaining sleeve;

means for biasing said ball closure means into the fluid channel of said valve means so that the fluids flowing through the conduit may urge the closure means into sealing engagement with said valve seating means;

said retaining sleeve moving means comprising a first spring confined between said first valve means and an annular shoulder located between said first and second valves on said retainer sleeve; and a second spring confined between said second valve means and said annular shoulder on said retainer sleeve;

said retainer means being continually urged by said first and second springs to a position between said first and second valve means so that when said means connecting said first valve means and second valve is released, said retaining sleeve is moved to a position which unlocks the closure means of said first and second valve means.

12. The apparatus of claim 11 wherein an annular region is formed between said housing and said sleeve and including a means for balancing fluid pressure within said annular region and outside said coupling.

13. The apparatus of claim 12 including a corrosive resistant fluid in said annular region to prevent corrosion of said housing and said sleeve.

* * * * *